United States Patent
Angerpointner

(10) Patent No.: US 6,830,337 B2
(45) Date of Patent: Dec. 14, 2004

(54) DEVICE FOR ROTATING A BODY ABOUT TWO AXES

(75) Inventor: Ludwig Angerpointner, München (DE)

(73) Assignee: Dr Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/381,074

(22) PCT Filed: Dec. 18, 2001

(86) PCT No.: PCT/EP01/14974

§ 371 (c)(1),
(2), (4) Date: Mar. 18, 2003

(87) PCT Pub. No.: WO02/055922

PCT Pub. Date: Jul. 18, 2002

(65) Prior Publication Data

US 2004/0027541 A1 Feb. 12, 2004

(30) Foreign Application Priority Data

Jan. 11, 2001 (DE) .......................... 101 00 872

(51) Int. Cl.⁷ .............................................. G03B 17/00
(52) U.S. Cl. ........................ 352/243; 396/427; 348/373
(58) Field of Search ................................ 396/419, 427; 352/243; 348/373; 310/68 R, 232

(56) References Cited

U.S. PATENT DOCUMENTS

| 4,673,268 A | 6/1987 | Wheeler et al. |
| 4,860,038 A | 8/1989 | Thatcher et al. |
| 5,153,485 A | 10/1992 | Yamada et al. |
| 5,165,853 A | 11/1992 | Pancotti |
| 5,443,235 A | 8/1995 | Bernhardt |
| 5,627,616 A | 5/1997 | Sergeant et al. |
| 5,751,078 A * | 5/1998 | Loewenthal .................. 310/36 |
| 6,628,338 B1 * | 9/2003 | Elberbaum et al. ......... 348/373 |

FOREIGN PATENT DOCUMENTS

| DE | 41 11 324 A1 | 4/1992 |
| DE | 42 38 900 C1 | 12/1993 |
| DE | 691 05 600 T2 | 4/1995 |
| DE | 297 12 356 U1 | 10/1997 |
| DE | 196 53 507 A1 | 6/1998 |
| EP | 0 714 579 B1 | 3/2000 |
| FR | 2 704 050 A1 | 10/1994 |

* cited by examiner

Primary Examiner—David Gray
Assistant Examiner—Arthur A Smith
(74) Attorney, Agent, or Firm—Brinks Hofer Gilson & Lione

(57) ABSTRACT

A device for rotating a body about two axes that includes a collector ring coupled to both a rotatable body and an axial movement drive mechanism for transmitting axial movements, so that rotary movements of the rotatable body about two axes are caused via axial movements of the collector ring, wherein a stator of the collector ring is seated, fixed against relative rotation, on a support body, and a rotor of the collector ring is connected with the rotatable body. At least one electrical unit, which is fixed against relative rotation with respect to the support body and is in electrical contact with the rotatable body via the collector ring.

14 Claims, 1 Drawing Sheet

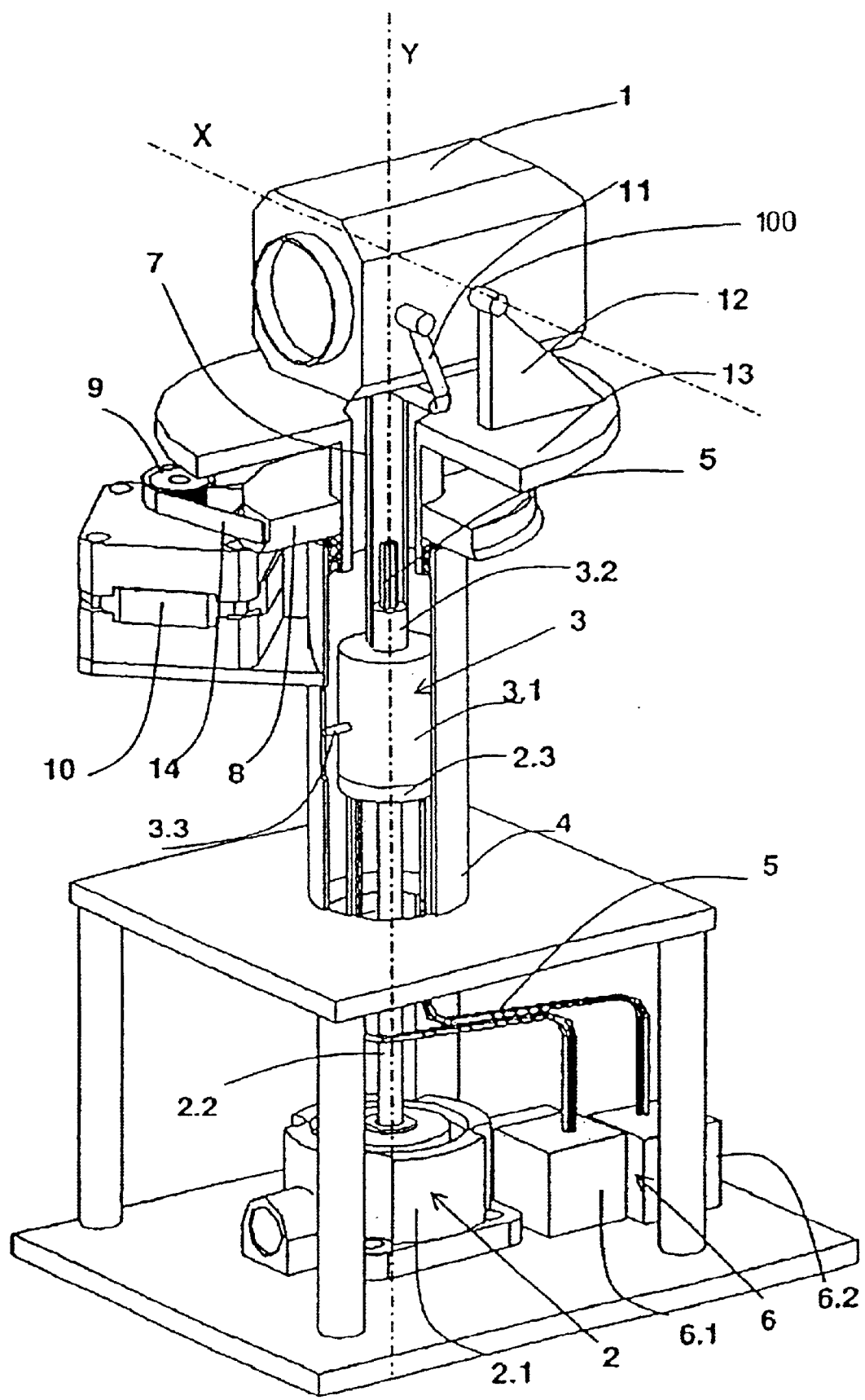

DEVICE FOR ROTATING A BODY ABOUT TWO AXES

The invention relates to a device for rotating a body about two axes.

By means of this device it is possible to introduce tilt movements (rotation about a horizontal axis) and swiveling movements (rotation about a vertical axis) into a body, for example an optical device. Such rotating movements are often required for the effective operation of remote-controlled cameras, but also of other devices, for example from the field of optics, such as light sources (searchlights, lasers, etc.).

Moreover, devices for rotating a body about two axes are also employed for moving tools in connection with robot technology.

Often the bodies to be rotated must be in electrical contact with an electric unit, for example for the exchange of signals or for transmitting an electrical current supply. Usually this electrical unit does not participate in the rotating movements of the body to be rotated and is arranged fixed in place. Collector rings are employed for making an unrestricted rotating movement of corresponding bodies about 360° possible.

A device for tilting and swiveling a camera is shown in U.S. Pat. No. 4,673,268. The collector ring described there is used both for transmitting the drive currents for the displacement motors, which rotate along, as well as for signal transmission. For this purpose, the collector ring was installed fixed in place and axially not displaceable in the support of the device.

Publication EP 0 714 579 B1 also discloses a device for tilting and swiveling a camera, wherein the drive mechanism responsible for the swiveling movement is fixed in place on a base plate. But the drive mechanism causing the tilting movement is arranged in such a way that it rotates when a tilting movement is performed. The collector ring provided for operating the device is also fastened stationary and axially not displaceable on the base plate.

A device for rotating a camera about two axes is also shown in DE 297 12 356 U1, wherein a swiveling motor is located on a rotatable component. In the arrangement shown there, the collector ring is not movable in the axial direction. Moreover, it can also not be stressed axially, because the two collector ring components of rotor and stator are mechanically separated when axial forces are applied.

The known devices have the disadvantage that at least one electrical rotary drive mechanism rotates along with the body to be rotated. This drive mechanism must be supplied with electrical energy via the collector ring, which makes the construction of the collector ring more elaborate. Added to this is that an electrical rotary drive mechanism has a not inconsiderable inert mass, which in turn causes considerable reaction forces, or moments, in connection with large angular accelerations. Often the dynamics of the entire device for rotating a body, inclusive of its drive mechanism, are limited by the mass moment of inertia, and therefore also by the mass of the components to be moved or, for a preset angular acceleration, requires the dimensioning of the relevant components to a corresponding extent.

The invention is therefore based on the object of providing a device for rotating a body about two axes, which is distinguished by simple construction and comparatively small inert masses.

This object is attained by means of a device in accordance with claim 1.

Advantageous embodiments of the device of the invention ensue from the steps in the claims depending from claim 1.

The advantage obtained by means of the invention rests in that by means of the novel device, the drive mechanisms for rotation about the two axes can be arranged fixed in place. In this way the entire structure is simplified inter alia, in that the collector ring has fewer sliding contacts. If desired, the collector ring can be embodied without contacts for transmitting a drive current, so that only sliding contacts for electrical low voltage signals must be provided. On the other hand, by avoiding drive mechanism which rotate along, it is possible to reduce the mass to be moved and therefore the mass moment of inertia of the entire device, so that the movement dynamics of the body can be increased. Moreover, by means of the invention a simpler and material-saving structure of the device for rotating a body about two axes is possible because of the reduced mechanical stresses.

The invention is particularly based on the concept that rotating movements are introduced into the body to be rotated by means of axial movements of the collector ring. The expression "axial direction" always is meant to be the direction of the collector ring axis.

A possible exemplary embodiment of the present invention will be explained in greater detail by the sole drawing.

The drawings show schematically the structure of a device for rotating a body in the form of a camera 1 about two axes X and Y, which are preferably orthogonally arranged.

So that a drive mechanism which rotates along with this device can be avoided, a rotating movement of the camera 1, in this example the tilt movement about the axis X, is originally caused by an axial movement drive mechanism in the form of a pneumatic lift drive mechanism 2. This lift drive mechanism 2 has a stationary element 2.1 and a lift element which is movable in the axial direction and in this example consists of includes a piston, not visible in the drawings, and a piston rod 2.2 connected with it.

Alternatively to this, an axial movement drive mechanism based on a hydraulic principle can also have advantages. However, the axial movement drive mechanism can also be embodied as an electrical drive mechanism. In this case either a commercially available rotary electric motor can be used, wherein the movement of the rotating shaft is converted into a linear movement, for example with a threaded spindle or a crank drive. However, a linear motor can also be advantageously used, by means of which a direct linear axial movement is generated. In this case the linear motor can be designed in such a way that its primary element encloses the secondary element to be moved—or vice versa—completely or partially (for example the moving coil principle). In case the body to be rotated does not absolutely need to be rotated with the aid of external energy about at least one axis, the axial movement drive mechanism can also be designed as a manually actuated device. Corresponding to the various embodiment options of the axial movement drive mechanism, the associated lifting elements must also each be differently designed. Thus, with rotary drive mechanisms based, for example, on an electric, pneumatic or hydraulic principle, threaded spindles or crank drives can preferably be used as lifting elements. With a linear motor, the moving secondary element is called a lifting element. Correspondingly, with pneumatic or hydraulic pistons, the moving pistons or lift rods, for example, are the lifting elements.

For the introduction of the axial movement, the lift rod 2.2 is coupled to the stator 3.1 of a collector ring 3. In this example, a flange 2.3, whose surface is glued together with the lower end of the stator 3.1 of the collector ring 3, is attached to the upper end of the lift rod 2.2. Recesses are provided in this flange 2.3, through which lines 5 for the video signal transmission and for the operation of a zoom drive in the camera 1 have been drawn.

The collector ring 3 must perform two functions, namely the transfer of the mechanical lifting motions, and the assurance of an electrical connection with the rotating camera 1.

The collector ring 3 consists of the stator 3.1 and the rotor 3.2. The stator 3.1 is the element which is arranged not displaceable with respect to a support body 4. In what follows an arrangement is to be assumed wherein the collector ring 3, i.e. the rotor 3.2 and the stator 3.1 together, forms a closed unit, or a separate component within the device for rotating the camera 1 about two axes X, Y.

As a protection against torsion, the stator 3.1 has two oppositely located radially outward directed shoulders 3.3 on its circumference, which can slide up and down in recesses of the tube-shaped support body 4 in accordance with the lift amplitude. These shoulders 3.3 permit an axial movement of the entire collector ring 3 in the support body, but prevent the rotary movement of the stator 3.1.

This goal can of course also be achieved by means of all interlocking torsion protection devices, such as polygonal shaft or angular cross sections of the stator 3.1, fitted, disk or splined shaft connections with a respectively corresponding counter-profile of the support body 4, for example.

In contrast thereto, the rotor 3.2 takes part in the rotating motion of the camera 1 to be rotated.

As already mentioned above, axial movements coming from the pneumatic lift drive mechanism 2, are introduced into the collector ring 3. A rotary movement around the axis X (tilting movement) of the camera 1 is caused by the axial movements. When constructing the collector ring 3 it is therefore necessary to take into consideration that it must withstand the axial stresses which can be generated by the introduction of this tilt movement. This is particularly important in those cases where the axial movement, and therefore the axial force, is only coupled to the stator 3.1 and is carried away via the rotor 3.2 to the body to be rotated. To prevent this shearing stress between the stator 3.1 and the rotor 3.2, the axial forces of the lift drive mechanism 2 can be introduced only into the rotor 3.2. This variation requires a special construction of the coupling between the rotor 3.2 and the lift rod 2.2, which permits the transfer of axial forces and simultaneously a relative rotation between the rotor 3.2 and the lift rod 2.2. In this connection, rolling bearings from the group of axial bearings are particularly suited as coupling element.

The collector ring 3 contains sliding contacts, by means of which electrical contact between the rotor 3.2 and stator 3.1, and in the end between the rotating camera 1 and the associated stationary and non-rotatably installed electrical units 6 is made. In this example the electrical unit 6 comprises a video unit 6.1 and a remote control 6.2 for a zoom drive in the camera 1. It must be ensured that the perfect functioning of the collector ring 3 is guaranteed in spite of the introduced axial force.

The upper end of the collector ring 3 is a part of its rotor 3.1. The latter is cylindrically constructed and is simultaneously used for receiving a hollow-cylindrical push rod 7. The connection between the push rod 7 and the end area of the rotor 3.2 must withstand the axial stresses, as well as transmit a relatively low torque. A useful connection, which is favorable from a production point of view, is achieved here by means of gluing. The lines 5 from the rotor 3.2 to the camera 1 lead through the hollow-cylindrical push rod 7.

The swiveling movement of the camera 1 is provided by a stationary electric motor 10, which is fixedly connected with the support body 4. On its shaft, this electric motor 10 has a drive gear wheel 9. The rotating movement of the drive gear wheel 9 of the electric motor 10 is transmitted via a toothed belt 14 to a power take-off gear wheel 8. The latter is connected, fixed against relative rotation, with the downward oriented pipe connector of the swivel platform 13. Depending on the transmission ratio of the toothed belt gear device 8, 9, 14, the rotary movement of the electric motor 10 is converted into a rotary movement of the swivel platform 13 around the axis Y, and in the end into the swivel movements of the camera 1.

The upper end of the push rod 7 is connected with a fork-shaped coupling mechanism 11, which is rotatably fixed to two sides of the housing of the camera 1. By means of the displacement of the axis of rotation X from the line formed through the two fixation points of the coupling mechanism 11 on the housing of the camera 1, a tilt movement of the camera 1 is created in the end by means of an axial movement of the lift rod 2.2.

Other arrangements, which differ from the coupling mechanism represented in the exemplary embodiment, can of course also be used. Thus, the coupling mechanism 11 can also be designed as a one-armed embodiment within the meaning of a cantilever seating. But it is also possible to convert the axial movements into rotating movements, in particular tilt movements of the body, in that the axial movements are introduced into an area of the body which is offset with respect to its axis of rotation, or bearing. This movement introduction can act directly on the housing of the body. The axial movement can of course also be introduced by means of a toothed rack which engages a gear wheel fastened on the body to be rotated. A construction wherein the rotary movement is introduced via the tractive power of a cable, a wire or the like is particularly cost-effective. In this case a restoring element, for example a spring, for rotation, in the direction toward the initial position is practical.

Differing from the exemplary embodiment shown, for example, searchlights, laser devices or robot components are also considered to be rotating bodies. Corresponding to the different types of bodies to be rotated it is also necessary to produce different electrical connections between the body and the stationarily arranged electrical units. It is preferably also possible to provide a system for measuring the tilted position of the body. In this case the position measuring signals can be transmitted via the collector ring to a further electrical unit embodied as an evaluating device. It is of course also possible by means of the device of the invention to determine the tilted position by means of the position of the lift rod, or that of the collector ring. If the body to be rotated is a robot component in particular, a multitude of sensor signals and electrical current for displacement drives can be transmitted to one or several electrical unit(s). In this case these comprise apparatus for evaluating the signals, as well as current supply devices.

Supplementary to the transmission of electrical energy it is also possible to transmit mass flows via the collector ring, which is then used as a rotary transmission passage at the same time. These mass flows can be, for example, compressed air for pneumatic devices or oil for hydraulic devices with which the body to be rotated is equipped. The said mass flows need not necessarily be used for transmitting auxiliary energy. It is also possible that the body to be rotated is used as a metering unit, so that appropriate media are conveyed via the collector ring with the rotary transmission passage from a stationary metering unit to a rotating body.

The invention also includes devices wherein rotary movements are introduced via the axial movements of several collector rings to several bodies which, for example, are arranged together on a swivel platform.

What is claimed is:

1. A device for rotating a body about two axes comprising:
    a collector ring coupled to both a rotatable body and an axial movement drive mechanism for transmitting axial movements, so that rotary movements of said rotatable body about two axes are caused via axial movements of said collector ring, wherein a stator of said collector ring is seated, fixed against relative rotation, on a support body, and a rotor of said collector ring is connected with said rotatable body;
    at least one electrical unit, which is fixed against relative rotation with respect to said support body and is in electrical contact with said rotatable body via said collector ring.

2. The device in accordance with claim 1, wherein an outer portion of said collector ring is used as said stator, and an inner portion of said collector ring is used as a rotor.

3. The device in accordance with claim 1, wherein said axial movements of said collector ring cause rotary movements of said rotatable body, whose axis of rotation is substantially oriented orthogonally with respect to a direction of said axial movement.

4. The device in accordance with claim 2, wherein said axial movements of said collector ring cause rotary movements of said rotatable body, whose axis of rotation is substantially oriented orthogonally with respect to a direction of said axial movement.

5. The device in accordance with claim 1, wherein said axial movements of said collector ring are converted into rotary movements of said rotatable body via a coupling mechanism.

6. The device in accordance with claim 1, wherein said axial movement drive mechanism comprises a stationary element and a lift element, which is movable in an axial direction and
    wherein said collector ring is coupled to said lift element.

7. The device in accordance with claim 6, wherein at least one rod for transmitting axial movement is arranged between said collector ring and said lift element.

8. The device in accordance with claim 1, wherein at least one rod for transmitting axial movement is arranged between said collector ring and said rotatable body.

9. The device in accordance with claim 1, wherein said axial movement drive mechanism comprises an electric motor.

10. The device in accordance with claim 1, wherein said rotatable body comprises a camera.

11. The device in accordance with claims 1, wherein said rotatable body comprises a light source.

12. The device in accordance with claim 1, wherein said rotatable body comprises a mirror.

13. The device in accordance with claim 1, wherein said rotatable body comprises a robot element.

14. The device in accordance with claim 1, wherein said collector ring also serves for the purpose of a rotary transmission passage for transferring fluid materials.

* * * * *